May 24, 1949.　　　　　W. H. BUSSEY　　　　　2,470,975
ELECTRICAL APPARATUS

Filed Oct. 26, 1945　　　　　　　　　　　　　6 Sheets-Sheet 1

Inventor:
William H. Bussey
By Robert L. Kahn
Atty.

May 24, 1949.    W. H. BUSSEY    2,470,975
ELECTRICAL APPARATUS
Filed Oct. 26, 1945    6 Sheets-Sheet 2

Inventor
William H. Bussey
by Robert C. Kahn
Attorney.

May 24, 1949.  W. H. BUSSEY  2,470,975
ELECTRICAL APPARATUS
Filed Oct. 26, 1945  6 Sheets-Sheet 3

Inventor:
William H. Bussey
By: Robert L. Kahn
Attorney

May 24, 1949.  W. H. BUSSEY  2,470,975
ELECTRICAL APPARATUS
Filed Oct. 26, 1945  6 Sheets-Sheet 4

Inventor
William H. Bussey
By: Robert L. Kahn
Attorney

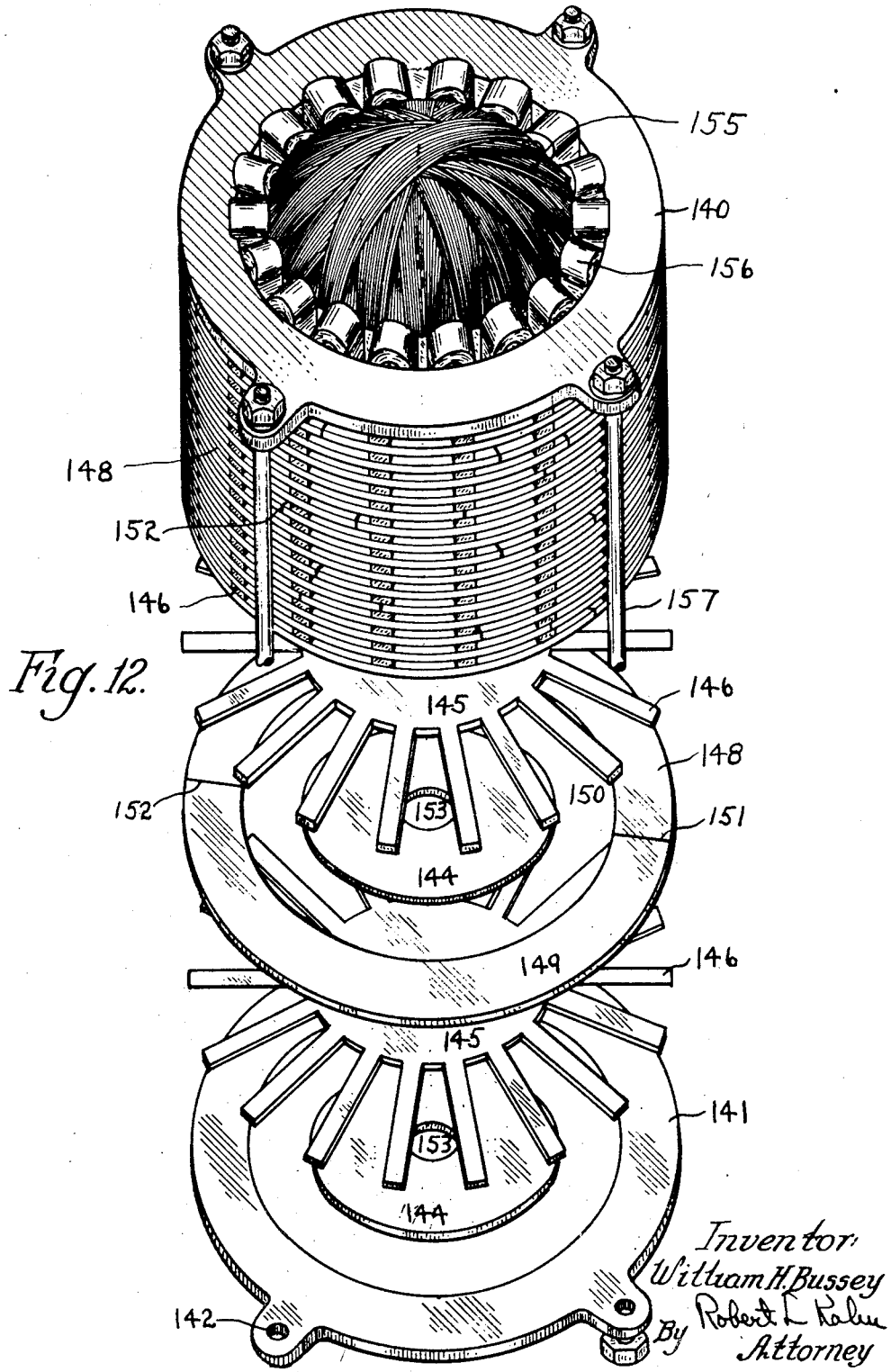

May 24, 1949.　　　　　W. H. BUSSEY　　　　　2,470,975
ELECTRICAL APPARATUS

Filed Oct. 26, 1945　　　　　　　　　　6 Sheets-Sheet 6

Inventor:
William H. Bussey
By: Robert L. Kahn
Attorney

Patented May 24, 1949

2,470,975

UNITED STATES PATENT OFFICE 2,470,975

ELECTRICAL APPARATUS

William H. Bussey, Chicago, Ill., assignor, by direct and mesne assignments, to Robert L. Kahn, Glencoe, Ill., as trustee Application October 26, 1945, Serial No. 624,849

13 Claims. (Cl. 321—68)

This invention relates to an electrical apparatus and more particularly to a frequency multiplier of the static type. Such a frequency multiplier may be designed to convert one frequency into an odd multiple thereof within a substantial range of multiplying factors.

A frequency multiplier utilizing the present invention is characterized by electrical and mechanical simplicity and the complete absence of any mechanically moving or delicate apparatus. A structure embodying the invention consists simply of metallic electrical and magnetic conductors and is not only static in operation but is free from components having a limited operating life.

The invention herein is based upon a phenomenon well known in the transformer art. This phenomenon involves the generation of pulses in a transformer excited with alternating current. Such a type of peaking transformer is disclosed in an article by O. Kiltie in A. I. E. E. 1932, page 802, volume 51.

The fundamental action of a transformer depends upon the fact that a conductor is cut by lines of magnetic flux. In the previously mentioned reference to a peaking transformer, the magnetic circuit is so constructed that it readily saturates. As a result, the change of flux is confined practically to a time interval when the exciting current is going through its zero value. It is true that some flux variation occurs even after saturation, but this is so small as to be negligible for transformer action at conventional frequencies of the order of 60 cycles per second. Thus, a secondary winding of a peaking transformer will have induced therein a voltage for a short portion of an exciting cycle.

A transformer of the above type fed with 60 cycles for example will generate 120 pulses per second. Such transformers as a rule are used where special trigger pulses are required as in the operation of grid controlled gas tubes. The pulses produced by such a transformer have a time duration relatively small in comparison to the period of a cycle.

The invention hereinafter described provides a device wherein pulses of alternating polarity are successively generated so as to provide a true continuously varying alternating current at a frequency higher than the exciting current. Due to geometrical considerations which will be apparent in connection with a detailed description of the invention, the multiplying factor is always an odd number. The range of factors may vary from a minimum of three up to a maximum depending upon the design of the device. In general, the smallest electrical angle subtended by a single pulse with reference to a primary energizing cycle will determine the maximum multiplied frequency. Thus, in the peaking transformer described by Kiltie, a pulse having an electrical angular extent of the order of about two degrees is described. This means that two pulses will have an angular extent of about four degrees with reference to 360 degrees on the exciting wave. Thus, if such a wave could be continuously generated, it follows that the frequency multiplication would be in the neighborhood of about 90. As hereinbefore pointed out, the actual factor is an odd number. Furthermore, due to physical limitations arising out of a structure embodying the present invention, frequency multiplication factors of the order of 89 would be undesirable in moderate size devices. In large sizes, such multiplying factors may be easily obtained.

A pair of multipliers embodying the invention herein may be cascaded with each having a multiplying factor of 9. Such resulting structures would be substantially smaller and more economical than a single large structure having a multiplying factor of the same order.

In accordance with the invention, a ferromagnetic structure is provided which may be broadly divided into three parts. Two parts are of ferromagnetic material so as to provide substantially continuous ferromagnetic paths therein. The third part is a path defining part which has length and width as well as thickness. This third part has spaced ferromagnetic elements extending across the path to form, in a magnetic sense, parallel magnetizable members. These ferromagnetic elements have non-magnetic elements on each side of them, these elements being generally air gaps and thus having no positive structural existence. In actual practice, such air gaps may have electrical conductors therein. Thus, along the length of the path, alternate non-magnetic and ferromagnetic elements are encountered. Polyphase windings are provided for either one or both of the first-named ferromagnetic parts. Such windings may have one winding energized by single phase alternating currents and shading windings to generate an out-of-phase current. Satisfactory operation is secured by separate phases having full phase angle between them. These polyphase windings cooperate with the entire structure to generate a resultant magnetic field. This resultant field extends from one ferromagnetic part across a portion of the path, this being across the length of the path, to the other ferromagnetic part and then across another conjugate portion of the path and back to the one ferromagnetic part. The exciting field is sufficiently intense so that the ferromagnetic elements for almost the full extent of each path portion across which flux streams are saturated leaving remaining ferromagnetic path elements unsaturated. The saturated ferromagnetic elements are divided into two conjugate groups and the unsaturated ferromagnetic elements are also divided into two conjugate groups. These four groups are disposed so that an unsaturating and saturating group alternates and they extend along a length of path which has an electrical length of 360 degrees referred to the primary exciting frequency. The path length may have any integral number of 360 degrees. For each 360 degrees, however, the ferromagnetic elements in the path for one output phase total two times an odd number. Coupled to each ferromagnetic element or a plurality of ferromagnetic elements operating as one element is at least one secondary winding element with all winding elements for one output phase connected in series. The series-connected winding elements form a secondary winding having two output terminals. The secondary winding as a whole may extend over one 360 degree length of path or may cover as many integral number of such lengths as are present. A number of winding elements covering 360 degrees of path length may, however, be considered as a complete secondary winding. Adjacent winding elements for the same output phase are reversed in polarity. Thus, as conjugate ferromagnetic elements are successively changed from a saturated to an unsaturated magnetic condition and then again to a magnetic saturated condition with the flux reversed, potentials will be generated in those winding elements coupled to such ferromagnetic elements. The action is due to the change in orientation of the magnetic field within the entire structure. Thus, the entire magnetic field for a 360 degree electrical length changes its orientation in all three parts of the multiplier.

It is preferred to so operate the multiplier, as by control of the exciting currents, that each unsaturating part of the magnetic field should not subtend, along the path, an electrical angle greater than that subtended by one ferromagnetic element. Thus, at any instant, a 360 electrical degree length of path may be analyzed as follows to show magnetic conditions. Two conjugate unsaturating parts of the magnetic field and two conjugate saturating parts of the magnetic field are so disposed that an unsaturating part alternates with a saturating part along the path. The saturating parts of the magnetic field are of opposite polarity. Each unsaturating part of the field contains a magnetic neutral line. The flux density varies from saturation at the saturating part of the field to zero at a neutral line and increases (with reversal of polarity) to saturation again at the conjugate saturating part of the field. The neutral lines are 180 electrical degrees apart and have flux of opposing polarity on opposite sides.

No transformer action at the ferromagnetic path elements is possible so long as the flux density remains uniform, namely at saturation value. However, when these ferromagnetic path elements become unsaturated and the polarity of flux reverses, transformer action can and does occur in the coupled winding elements to generate waves of alternating potential.

The invention provides two broad specific forms having some different operating characteristics. Thus, in one form of the invention, the path along which the magnetic field travels may lie generally in a plane or parallel planes. In such case, it is necessary for the secondary winding as a whole to weave back and forth across the plane or planes. The other form provides a secondary winding whose winding units all lie within one or more parallel planes but have the path of magnetic travel weaving back and forth across the planes determined by the winding elements. Each of these forms may take on a number of different structural modifications. Thus, each form may be constructed in a so-called radial type or may be constructed in a so-called cylindrical type—all of which may be apparent later when the drawings are explained. In addition, a derivative of the cylindrical form may be obtained by distortion of cylinder section.

The coupling between the primary exciting windings and secondary output winding is limited in some degree by the leakage reactance inherent in the device. This coupling is, as a rule, not as close as in a conventional transformer.

Tuning means in the secondary circuit may be provided for optimum performance. Such tuning means may take on various forms and usually include condensers for providing resonant circuit conditions. Thus, the secondary winding may have a tuning condenser in series therewith for tuning to the multiplied frequency.

In order to more fully explain the general principles of operation of structures embodying the invention and in order to disclose various embodiments of structures embodying the invention, reference will now be made to the drawings, it being understood that such disclosures merely show some of the more simple embodiments of the invention.

Figure 12 is a perspective elevation with certain parts shown in exploded form illustrating a multiplier generally following along the lines of Figure 11 but having a somewhat different primary winding arrangement.

Figure 1:
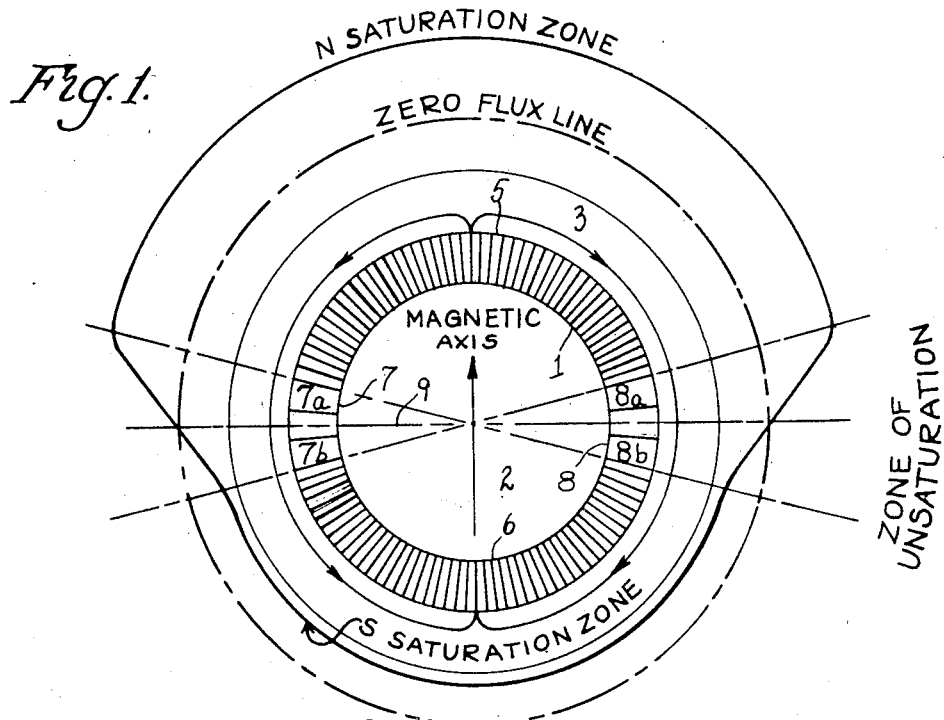
Figure 1 shows a diagram illustrating the principle of operation of a multiplier embodying this invention.

Referring first to Figure 1, a somewhat more concrete explanation of the principles underlying the invention will be made. For simplicity, an idealized structure will be assumed. The actual principles underlying the invention may, of course, apply to other forms of idealized structures and will naturally apply to various forms of actual structures.

As pointed out before, the diagram shown in Figure 1 is merely idealized and, for simplicity, is assumed to have no thickness normal to the drawing. Thus, a multiplier may have annular path defining part 1 which has length and width. The length of path defining part 1 is measured circumferentially while the width is, of course, measured transversely, in this particular instance radially. Path defining part 1 has a length corresponding to one or more integral number of 360 electrical degrees, this being with reference to one complete cycle of primary exciting current. As is well known, in the case of polyphase currents, one of the phases is arbitrarily taken as a reference phase and a complete cycle is considered to be 360 electrical degrees.

Path defining part 1 is disposed between ferromagnetic part 2, which is here shown enclosed by part 1, and ferromagnetic part 3, which is here shown as an annular region surrounding part 1. Path defining part 1 along its length consists of alternate ferromagnetic and non-magnetic elements. The non-magnetic elements provide space for secondary winding elements within which multiplied frequencies are generated. Various path constructions will be shown in connection with the remaining figures of the drawing. For each phase of output multiplied frequencies, the number of ferromagnetic elements along 360 electrical degrees of path will be two times an odd number.

At any particular instant, the magnetic condition of the multiplier may be shown. Thus as an example, let it be assumed that the primary exciting field at some instant has its magnetic axis pointing up and down, as shown in the drawing. By magnetic axis is meant the line indicating the direction of maximum magnetomotive force. It is understood that, in the diagram, the exciting field is rotating while maintaining its resultant field intensity substantially constant. Thus, the arrow in Figure 1 representing the direction and intensity of magnetomotive force may be considered as rotating around the center of the magnet structure while maintaining its length constant. At the instant assumed with the arrow pointing as shown in Figure 1, magnetomotive force will generate magnetic flux. This flux forms closed paths as is well known. A complete flux loop may be described by starting somewhere in ferromagnetic part 2, crossing that part of path 1 above the horizontal axis of Figure 1, then continuing in ferromagnetic part 3, going below the horizontal axis, recrossing another part of path 1 below the horizontal axis and reentering ferromagnetic part 2.

It is understood that the lines of magnetic flux stream across from ferromagnetic part 2 to ferromagnetic part 3 over almost the entire extent of path 1 above the horizontal axis. The same applies to the flux going from ferromagnetic part 3 to ferromagnetic part 2 and crossing the path 1 below the horizontal axis.

By proper design and excitation, it is possible to have the magnetomotive force sufficiently great so that the resulting flux saturates the ferromagnetic elements in two parts of path defining part 1. These two parts are indicated as zones 5 and 6 respectively. In zone 5, with the field as indicated, the flux will be going from ferromagnetic part 2 across path defining part 1 to ferromagnetic part 3. In zone 6, the polarity will be opposite. Between zones 5 and 6 are two zones 7 and 8, each of which includes a neutral region. The ferromagnetic elements in these two zones will be unsaturated. The flux density decreases in 7a till horizontal axis 9 is reached at which point it is theoretically zero. In 7b, the flux polarity is reversed but otherwise the variation in density from zero at the horizontal axis to a saturating value is similar. The same applies to 8a and 8b. At any instant, therefore, the exciting windings generate in path defining part 1 two conjugate saturated zones 5 and 6 and two conjugate unsaturated zones 7 and 8. These four zones alternate along the path length. The term saturated and unsaturated is used with reference to the magnetic condition of the ferromagnetic elements in those portions of the path defining part 1. Still referring to the magnetic condition of the multiplier as indicated in Figure 1, horizontal axis 9 may be considered as a neutral axis along which no differences of magnetomotive force exist at least in path defining part 1. Curves show on a polar scale the instantaneous magnetomotive forces at portions of the path.

We may now consider what happens when the exciting field is rotating. In that case, the field changes its orientation within parts 1, 2 and 3 and, in this particular structure, has a rotary motion with respect to the center of the structure. Thus, the conjugate saturated and unsaturated zones move along path 1. Secondary winding elements (not shown) at the unsaturated zones will have transformer action therein. Winding elements in the saturated zones will have little or no transformer action therein and, in any event since adjacent winding elements are reversed in polarity, any resultant E. M. F.'s will be eliminated. Thus, two conjugate unsaturated zones whirl around path 1 and result in transformer action in successive winding elements along the path. As will be shown later, the polarity is such that winding elements in the conjugate unsaturated zones cooperate to form an output E. M. F.

By controlling the intensity of excitation of the structure, the extent of the unsaturated zone along path 1 in terms of electrical angle may be controlled. As hereinbefore pointed out, this excitation should be such that no more than one secondary winding element should be included in any one of these unsaturated zones. This is with reference to one output phase. Obviously, it is possible to have two or three successive winding elements within an unsaturated zone at a particular instant and have each winding element form part of an output phase system of ferromagnetic elements. This is similar to conventional theory in polyphase generators and is well known to those skilled in the art.

The magnetic condition of ferromagnetic parts 2 and 3, as far as saturation is concerned, is of no great importance. In practice, it will be found that some parts of ferromagnetic parts 2 and 3 may be saturated but that substantial portions thereof will be unsaturated.

Figure 2:
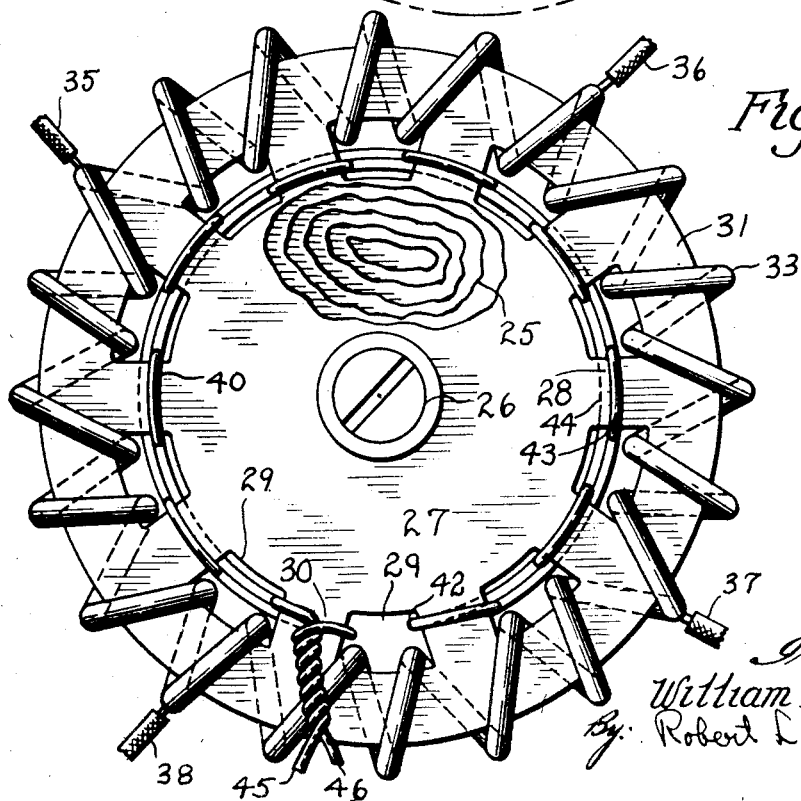
Figure 2 is a plan view with certain parts broken away of one simple form of my multiplier.

In Figure 2, there is shown a simple structure embodying the invention. The structure comprises a plurality of disc laminations 25 rigidly retained by bolt 26. Each disc comprises a central ferromagnetic portion 27 which may be solid or not as desired. Central portion 27 is bounded by that portion of the disc making up the path defining part and consists of annular region 28 having a series of slots 29 spaced at uniform angular intervals. The number of slots 29 is preferably two times an odd number, so that an odd number of secondary pole pairs may be generated. Between adjacent slots 29 are teeth 30.

Beyond path defining part 28 is ferromagnetic part 31, which may merely be an annular ring. Disc 25 may be made of any suitable metal and is proportioned to provide the magnetic effects desired. Thus, it will be desirable to excite the structure so that all but two of teeth 30 are at saturation. It is desirable to maintain inner and outer ferromagnetic parts 27 and 31 generally below saturation. The discs are aligned and maintained in this position.

In order to generate a rotating field, exciting winding 33 is provided. This winding may be of any type and, as shown here, is of the Gramme ring type. The winding consists of a suitable number of conductors threaded around outer region 31 by way of slots 29. As shown in Figure 2, the laminations are provided with ten slots 29. While the winding may be fed by any number of phases, the connections are shown for two phase operation. Winding 33 may have separate electrical circuits for each of the two phases or may have all of the conductors closed on themselves with taps at proper points for the phase connections. Inasmuch as it is desirable to have the winding divided into equal quarters and to avoid connection difficulties, winding 33 preferably has a number of turns per slot. Thus, two turns for each tooth may be used, so that the winding may be considered as having twenty turns with two turns for each slot. Hence, by taking a connection off at every fifth turn, the entire winding will be divided into uniform quarters. Thus, taps 35 to 38 inclusive will be taken off.

If alternating currents are impressed on the winding, one phase being impressed across taps 35 and 37, and the other phase being impressed across taps 36 and 38, a rotating field will be produced. Three phase excitation may obviously be provided if desired. In such case, the total wire turns should be divisible by three or six, depending upon the type of connections between phases.

Secondary windings are provided, such windings including as one example one or more turns around each tooth. Thus, a simple winding may be formed by conductor 40 being threaded alternately over and under a tooth until point 42 is reached, whereupon the wire may be reversed on itself and threaded back. As shown in Figure 2 for example, conductor 40 in advancing toward point 42 may pass over teeth 30 and form loop 43. After the conductor has reached point 42 and retraced its path, the conductor will form loop 44 around the bottom of teeth 30. Since the various loops are all part of one conductor, it is clear that, for all practical purposes, each tooth 30 may be considered as surrounded by a secondary winding element. The secondary winding elements are connected in series and have output leads 45 and 46. Only one output phase is shown.

Applying the reasoning used in connection with Figure 1, unsaturated regions will exist at two opposed or conjugate places. Transformer action will occur in those conjugate secondary winding elements which are coupled to ferromagnetic teeth in the zones of unsaturation. As successive conjugate teeth become unsaturated, the seat of transformer action will move.

As the unsaturated regions sweep from one pair of teeth through a pair of slots and then to a succeeding pair of teeth, it is evident that some magnetic discontinuity will result. This, of course, is generally present in motors and generators of various types.

The multiplier shown in Figure 2 may be considered as a pancake type wherein the path defining part lies in a plane here flat (disregarding thickness). Obviously, winding elements weave back and forth across the plane.

Figure 3:
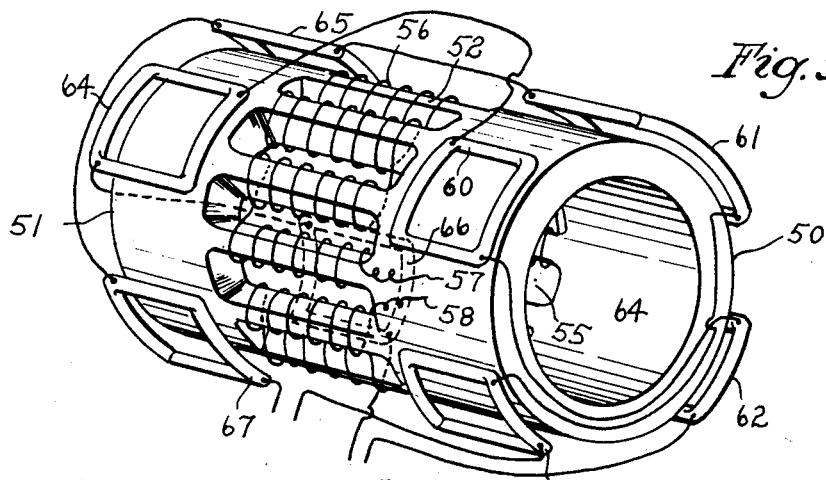
Figure 3 is a perspective view of a modified form of multiplier.

Referring now to Figure 3, a modification is shown. This comprises cylinders 50 and 51 longitudinally spaced and having a plurality of longitudinal teeth 52 connecting said cylinders. As is clearly evident from the drawing, cylinders 50 and 51 have interior regions 54 free of metal. Teeth 52 extend circumferentially around the region joining cylinders 50 and 51. Teeth 52 may be separated by slots 55. The number of teeth 52 is two times an odd number, thus providing an odd number of pole pairs. Wound around each tooth 52 is secondary winding element 56. Adjacent winding elements 56 are connected in such a manner that the polarity of successive elements alternates. Leads 57 and 58 are provided for the beginning of the first winding element and the end of the last winding element, thus providing a connection for the secondary winding as a whole. It is clear that there will be an even number of winding elements. Thus, if winding element number 1 is of one polarity, all the odd winding elements will be of the same polarity and the even-numbered elements will be of an opposing polarity. Since the number of winding elements is two times an odd number, it follows that diametrically opposed winding elements will have opposing polarity. The potential induced in diametrically opposed winding elements will be aiding, since the change in flux in one unit is opposite to the change of flux in the opposed unit.

In order to induce potentials in the winding elements, it is necessary that flux lines pass along the teeth from one cylinder to the other. To this end, cylinder 50 may have field windings 60 to 63 inclusive disposed at uniform angular intervals circumferentially around cylinder 50. Similarly, cylinder 51 will have field windings 64 to 67 inclusive. Windings 60 and 64 are preferably aligned longitudinally along the two cylinders. The same is true of windings 61 and 65; windings 62 and 66 and windings 63 and 67 respectively. Windings 60, 64, 62 and 66 are all energized simultaneously from one phase. The polarity of these windings is such that windings 60 and 62 are of opposite polarity. Windings 60 and 64 are also of opposite polarity. Windings 64 and 66 should be of opposite polarity. Thus, if at any instant winding 60 is generating a north pole at the teeth 52 adjacent the winding, winding 64 will generate a south pole, and the flux will pass along the teeth from cylinder 50 to cylinder 51. At the same instant, flux from winding 66 will pass through teeth 52 toward winding 62.

The remaining field windings are similarly connected and are energized by phase two. The net resultant will be the generating of a rotating field in cylinder 50 and a rotating field in cylinder 51. These two fields will be rotatively 180 degrees out of phase. By maintaining the field strength at a sufficient value and by proper design of the magnetic circuit, all but two diametrically opposed teeth will be maintained at saturation. The two diametrically opposed teeth will be unsaturated at a particular instant. As the magnetic field rotates, successive pairs of teeth will be effective for transformer action.

It is clear that the entire structure may have a sufficiently large diameter so that more than two effective poles in each cylinder will be generated. Thus, a correspondingly slower rotation of the field will result. The number of active winding units in which transformer action occurs will be directly in proportion to the number of exciting poles. If the field is considered as rotating at one-third maximum speed due to the formation of three effective pole pairs in the field structure, there will be three pairs of winding units in which transformer action will occur. The path defining part will then have three 360 electrical degree lengths.

The showing of the field windings is merely diagrammatic. In actual practice, the windings may be disposed in slots in cylinders 50 and 51 and will have sufficient angular extent so that a true rotating or progressing field will result. It is also possible to have all windings on one cylinder. The objective is to generate a magnetic field which extends from one cylinder across the path defining part to the other cylinder, then back across the path defining part at another region and back to the one cylinder.

The structure shown in Figure 3 is obviously of the cylinder type having a path defining part lying in a cylindrical plane (disregarding thickness) with the winding elements weaving back and forth across the path plane.

Teeth 52 will preferably have a suitable cross sectional area in proportion to the air gaps between them and also in proportion to cylinders 50 and 51 so that the multiplier action occurs as previously described in general.

Figure 4:
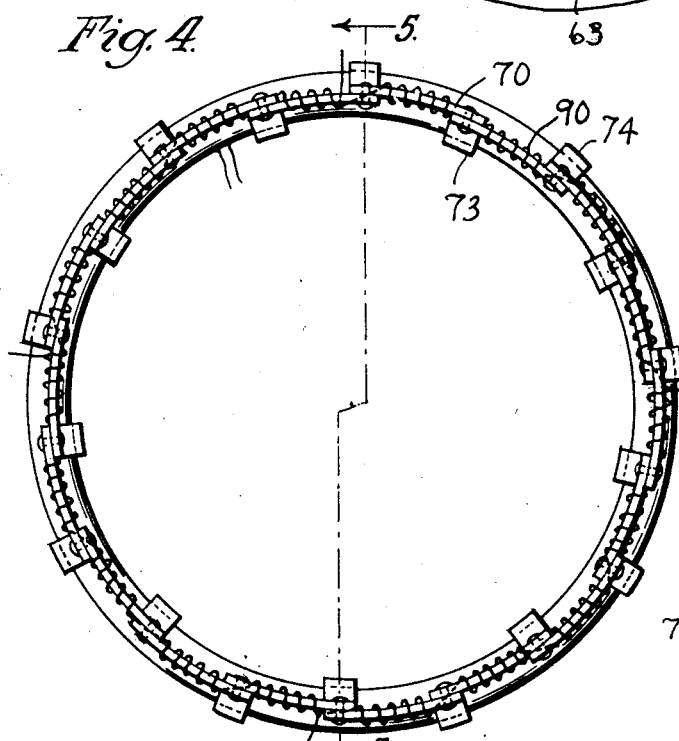
Figure 4 is a side elevation of another modified form of multiplier.
Figure 5:
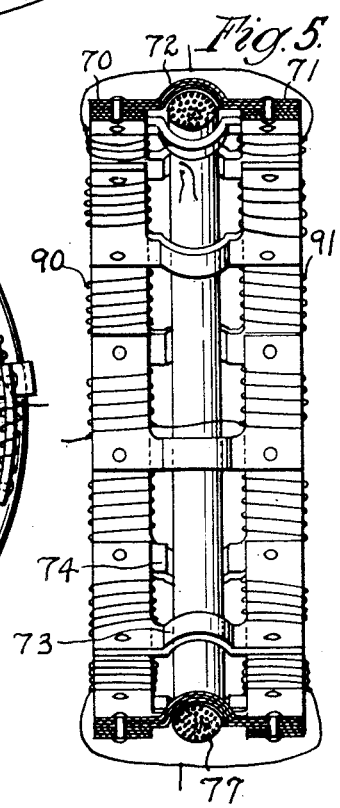
Figure 5 is a sectional view on line 5—5 of Figure 4.
Figure 6:
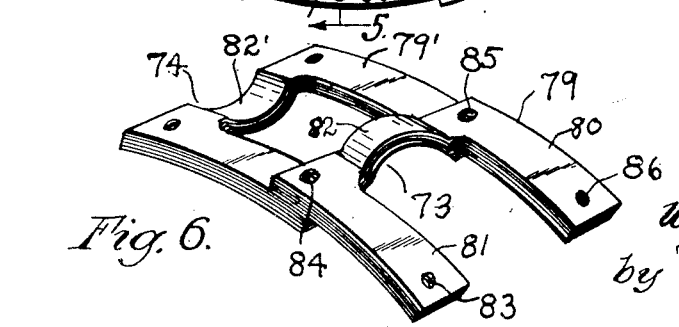
Figure 6 is an isometric detail showing the ferromagnetic elements of the structure of Figures 4 and 5.

Referring now to Figures 4 to 6 inclusive, a structure is shown wherein the secondary winding in which frequency multiplied currents are induced is in the form of a simple coil. The magnetic structure itself is more complex in that the saturating portion of the field weaves back and forth across the secondary winding as the saturating portion of the field progresses along the magnetic path. Thus, referring to these figures, the structure comprises two circular ferromagnetic path parts 70 and 71 between which lies path defining part 72. Ferromagnetic parts 70 and 71 provide substantially continuous ferromagnetic paths along their lengths. Thus, these two ferromagnetic parts are here shown as circular, although any other shape is permissible. The circular construction, both from geometrical and electromagnetic considerations, is simplest and easiest to design. These two parts when circular are preferably similar and have the same dimensions and diameters. It is, of course, conceivable that one part, such as 70, may have a different diameter, either larger or smaller, than the other part, such as 71.

Path defining part 72 consists of transverse ferromagnetic elements 73 and 74. Ferromagnetic elements 73 and 74, as shown, are bent respectively on opposite sides of the cylindrical plane joining the peripheries of ferromagnetic parts 70 and 71. In this particular instance, ferromagnetic elements 73 are curved inwardly toward the center of the axis of the entire structure, this axis being the line joining the centers of ferromagnetic parts 70 and 71. Ferromagnetic parts 74 are bent away from the axis. It is evident from the drawing that the portions of ferromagnetic elements 73 and 74 that are bent toward and away from the axis lie between ferromagnetic parts 70 and 71. It is clear that along the length of path defining part 72, the length in this case being circumferential, alternate ferromagnetic elements and air gaps are disposed.

From the structure shown, secondary winding 77, consisting of many turns of wire, may be disposed so that the complete winding is in the form of a simple coil with ferromagnetic elements 73 and 74 alternately threading inside and outside of the winding. The secondary winding elements may be considered as the lengths of wire coupled to ferromagnetic elements 73 and 74. All these secondary elements are connected in series. It is evident that complete secondary 77 may consist of one turn composed of a large number of wires in parallel, or may consist of a single wire wound around to form a coil with a large number of turns.

It is, of course, possible to have ferromagnetic elements 73 and 74 extend straight across from one ferromagnetic part 70 to other ferromagnetic part 71. In that case, it would be necessary to wind the secondary winding in the form of a multi-pointed star shaped to thread under and over the ferromagnetic elements.

The actual construction of the device shown in Figures 4 and 5 may be carried out in a simple manner by using elements shown in Figure 6. Thus, as shown in Figure 6, a group of laminations having a general U shape is shown. This group, generally indicated by numeral 79, has arms 80 and 81 connected by cross arm 82. It will be noted that cross arm 82 is curved away from arms 80 and 81. Thus, cross arm 82, when curved in one direction, will form ferromagnetic elements 73 and, when curved in the other direction, will form ferromagnetic element 74. Arms 80 and 81 are also curved along the arc of a circle lying in a plane generally normal to the plane of cross piece 82. Thus, arm 80 may be the arc of the circular ferromagnetic part 70, while arm 81 forms the corresponding arc of ferromagnetic part 71. Bolt holes 83 to 86 inclusive may be provided. An adjacent assembly 79' having cross piece 82' curved in the opposite direction to 82 may be provided.

From Figure 4, it is evident that assemblies 79 and 79' may be joined together as shown with adjacent assemblies being bolted or riveted together as the case may be. Thus, since cross pieces 73 and 74 are to be saturated, it is desirable that ferromagnetic parts 70 and 71 have sufficient metal circumferentially of these parts for satisfactory operation.

Excitation of the entire structure may be secured in a number of ways. A simple exciting winding has the form of a Gramme ring winding similar to that of Figure 2. Thus, primary winding 90 may be wound around ferromagnetic part 70, while winding 91 may be wound around ferromagnetic part 71. Taps at suitable intervals may be provided. The polarity between windings 90 and 91 will have to be observed in a manner similar to that in Figure 3.

Figure 7:
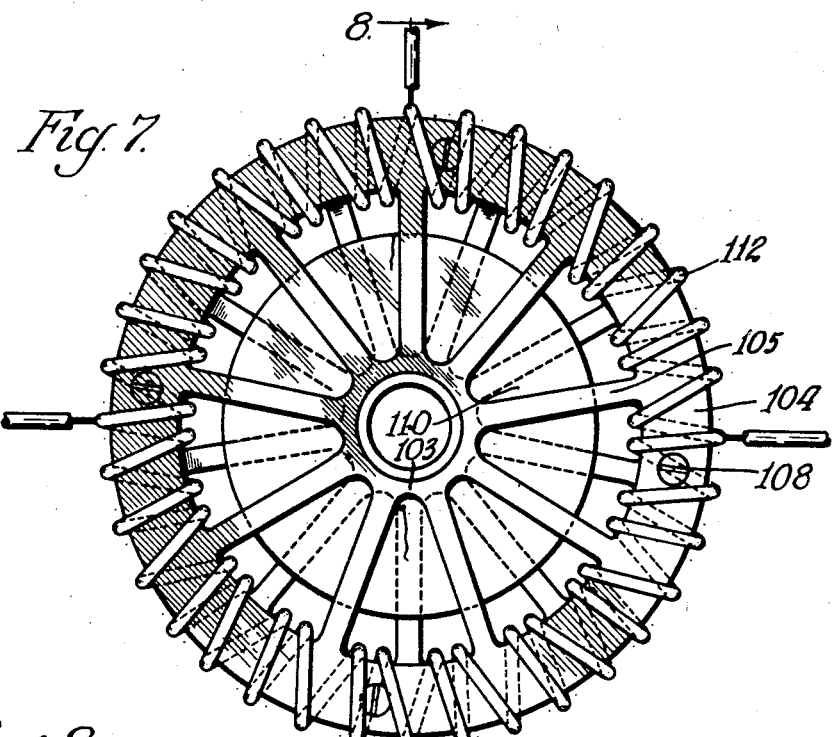
Figure 7 is a side elevation of still a different modification of a multiplier.
Figure 8:
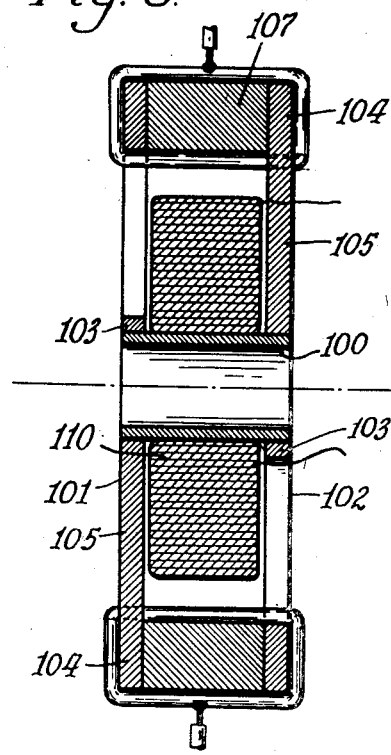
Figure 8 is a section on line 8—8 of Figure 7.
Figure 9:
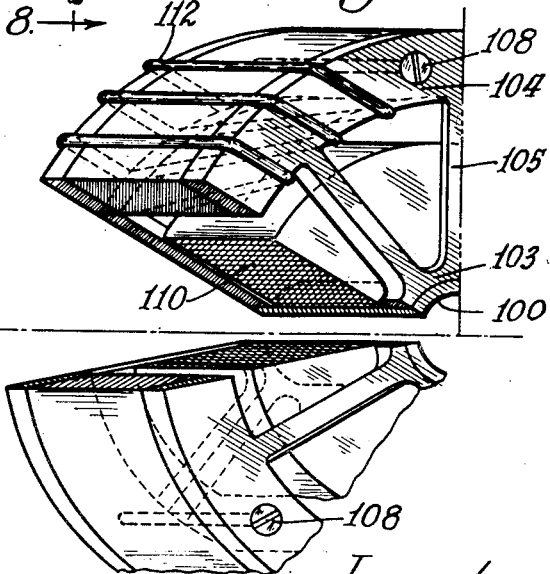
Figure 9 is a perspective view of the structure shown in Figures 7 and 8 with a certain portion broken away.

Referring now to Figures 7 to 9 inclusive, another modified form is shown wherein the secondary winding is in the form of a simple coil and wherein the magnetic field weaves back and forth across the secondary winding as it changes its orientation. This structure comprises in one simple form hub 100 of suitable ferromagnetic material. This hub may be a solid rod if magnetic conditions so require. At each end of hub 100, there may be disposed spiders 101 and 102. These spiders are preferably similar in construction, and consist of a central ring 103 and outer ring 104 between which spokes 105 extend. Each spider has an odd number of spokes, the number in each spider being the same. No attempt is made to show the relative proportions of spokes and air gaps between adjacent spokes or between spokes and the central and peripheral portion of the magnetic structure as a whole.

Spiders 101 and 102 are so disposed on hub 100 that one is staggered with respect to the other. The two spiders are symmetrically disposed with regard to the staggering so that the spoke of one is substantially mid-way between the opposed spokes of the other spider.

Ring 107 is disposed between the opposing faces of the peripheral portions of the two spiders. In order to maintain the assembly intact, bolts 108 may be provided passing through peripheral portion 105 of one spider and ring 107 to peripheral portion 105 of the other spider. It is understood that all the parts so far described are of ferromagnetic material. Spiders 101 and 102 may be of material such as Mumetal or other material which may be readily saturated. However, these spiders and the remaining portions of the structure so far described may be of ferromagnetic material customarily used in transformer constructions. If desired, spiders 101 and 102 may be laminated, each lamination forming a complete spider. In case hub 100 is to be laminated, it will be understood that the laminations will be concentric cylinders or, in the alternative, hub 100 may be formed of one continuous thin strip of ferromagnetic metal coiled around to form a spiral. The same applies to ring 107. Inasmuch as the magnetic flux through hub 100 and ring 107 extends generally across from one spider to the other, the reason for the disposition of laminations will be obvious. In the case of spiders 101 and 102, the flux extends between the hub and peripheral portion.

Secondary winding 110 may be disposed around hub 100 between spiders 101 and 102. This secondary winding may be in the form of a simple coil which may be slipped over hub 100 before the second spider is positioned on the hub.

Excitation of the structure may be provided in any one of a number of different ways. For simplicity, a Gramme type of winding 112 is shown. This winding is generally similar to the exciting winding in Figure 2, and may have equally spaced taps for connection to an exciting circuit. It is understood that, instead of a Gramme type of winding, other types of windings for generating a rotating field may be used. Thus, the windings used in the stators of polyphase motors may be used. It is also possible to use a modified type of drum winding common in direct current motors and generators. A simplified form of such drum winding is shown diagrammatically in Figure 11.

Figure 10:
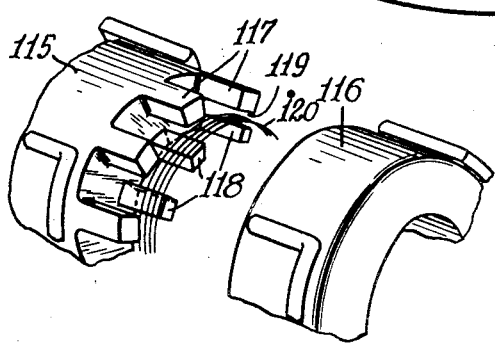
Figure 10 is a perspective detail of still a further modification of a frequency multiplier.

Referring now to Figure 10, a modification is shown wherein the physical structure of the multiplier is somewhat similar to that shown in Figure 3 but changed to permit of the use of a simple coil winding for the secondary such as used in the constructions shown in Figures 4 and 7.

Cylinders 115 and 116 of ferromagnetic material are connected together by two concentric sets of ferromagnetic teeth 117 and 118. Each set has an odd number of teeth, the same number for each. One set is angularly staggered with respect to the other. As shown, teeth 117 form the outer set and teeth 118 form the inner set. The relative cross sections of the teeth and intervening air gaps are susceptible to wide variation. It is desirable to design the inner set so that the cross sectional area of a tooth is substantially equal to the cross sectional area of a tooth in the outer set. However, this may be varied within wide limits. Between the two sets of teeth is annular space 119 within which may be secondary winding 120 in the form of a simple coil.

The excitation of this form may be accomplished in the same manner as the form shown in Figure 3. The two sets of teeth may be cut along a plane perpendicular to the axis of the structure to permit of the insertion of a formed coil.

Figure 11:
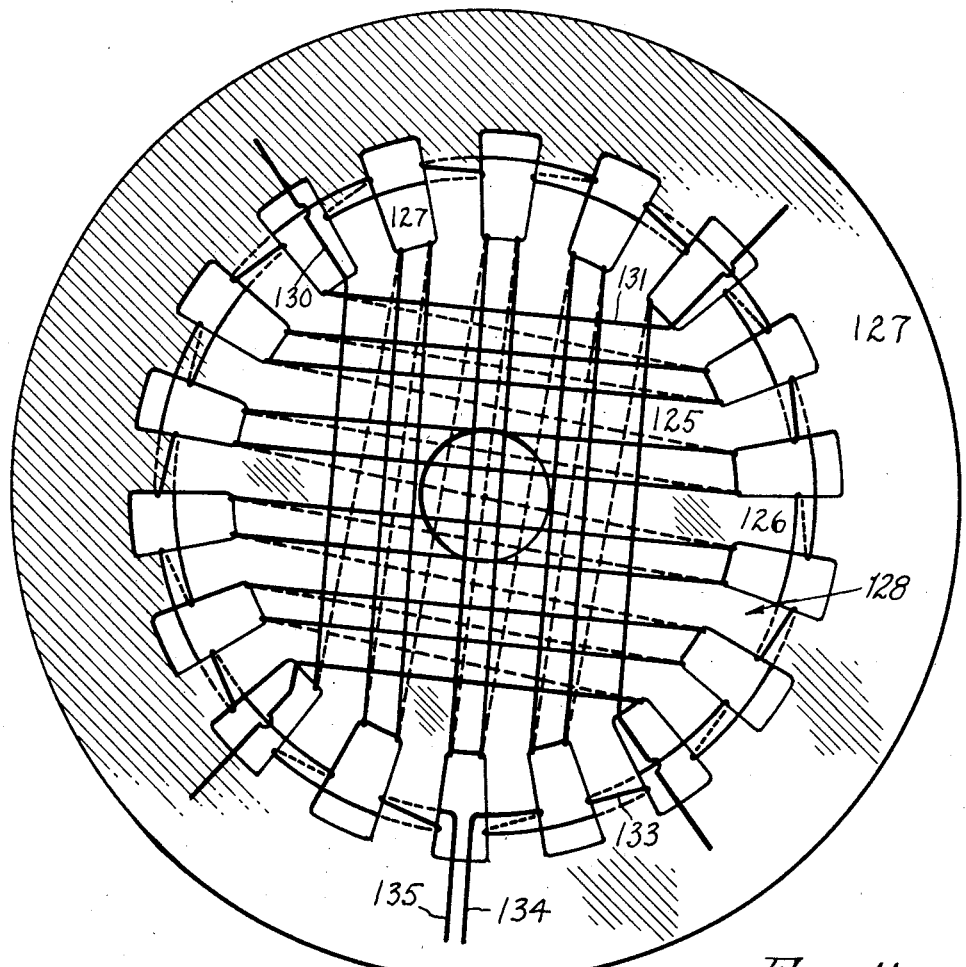
Figure 11 is a generally diagrammatic plan view of a modified frequency multiplier.

Referring now to Figure 11, there is shown in diagrammatic form a structure having simplified drum windings as the exciting means and secondary winding elements forming a complete secondary winding. An exemplary physical structure is shown in Figure 12. In Figure 11, a magnetic structure is shown wherein inner portion 125 is surrounded by annular path defining portion 126, which, in turn, is surrounded by outer ferromagnetic portion 127. A physical embodiment of the structure would have a dimension perpendicular to the plane of the drawing and, in the event that the structure is formed of laminations, each lamination would lie in a plane parallel to the drawing.

Path defining portion 126 consists of alternate slots 127 and teeth 128. The number of teeth is two times an odd number. In this particular instance, the multiplication factor is nine so that there are eighteen teeth.

The exciting windings are shown for two phase operation. It is understood, of course, that as many phases may be provided as may be found desirable. In this particular instance, winding 130 may be provided for one phase and winding 131 may be provided for the other phase. As shown, each slot has two conductors with the wire going down perpendicular to the plane of the drawing to the bottom of the magnetic structure and then continuing on in dotted lines. In actual practice, it may be necessary to change the distribution of conductors to provide for uniform flux distribution. This, however, is well known in the art of motor and generator winding.

Other types of drum windings may be used. Thus, the ordinary winding technique used in direct current motors and generators may be applied here with the exception that the commutator is omitted. Otherwise, the general expedients for providing a closed winding which will progress around a magnetizable structure may be utilized. In such a closed winding, taps at suitable points may be taken off for the different connections, these points being derived in the same general manner as with the Gramme ring windings.

Disposed around each tooth 128 is secondary element 133. Adjacent elements 133 are reversed in polarity. As drawn, the actual pitch or direction of winding is reversed. It is, of course, possible to have the winding elements all go in the same direction and merely reverse connections. Secondary winding elements 133 are connected in series to form a complete secondary winding having output terminals 134 and 135.

With proper excitation of windings 130 and 131, a rotating field is produced. This field will saturate all but two conjugate teeth 128 for every 360 electrical degrees of path. As the resultant field rotates, the magnetic condition of unsaturation in conjugate teeth moves progressively along the path. Thus, transformer action in conjugate pairs of winding elements is provided and, as shown here, a frequency multiplication of nine will be present in the secondary winding.

Referring now to Figure 12, a multiplier structure is shown along the lines disclosed in diagrammatic Figure 11. The structure comprises massive end plates 140 and 141 having suitable apertured ears 142. Between these end plates, there is disposed a stack of laminations, a few being shown in exploded form. Thus, the structure consists of alternate discs 144 of suitable ferromagnetic material and toothed members 145 having teeth 146. Member 145 has the disc portion substantially of the same diameter as disc 144, while teeth 146 extend from the circumference thereof. Member 145 has two times an odd number of teeth for one output phase. The actual proportion of tooth width and gap, as well as precise shape of the teeth, will depend in a large measure upon various engineering characteristics, all of which are known by one skilled in the design of generators and transformers.

Discs 144 and members 145 alternate. Surrounding each disc 144, with the possible exception of the very end ones, are split annular members 148 and 149. As shown here, members 148 and 149 each are semi-circular so that they may be fitted together to form a complete annulus. This annulus has such a size as to provide annular space 150 between the annulus itself and the enclosed disc.

It is understood that, in assembling the structure, members 145 will be aligned so that teeth 146 will be aligned along the axis of the entire device; vertically in the drawing. With respect to annular members 148 and 149, it is preferred to have a random circular orientation so that air gaps 151 and 152 between the ends of abutting members will not be aligned vertically of the structure.

Discs 144 and toothed members 145 have suitable central apertures 153 through which a bolt may pass for rigidly clamping the entire structure.

Primary exciting windings may then be provided. These windings indicated in general by numeral 155 will pass down between teeth 146 in space 150. Thus, wire extends down between the teeth generally parallel to the longitudinal axis of the structure and then crosses over the end as shown at the top of the figure. The bottom of the structure in general will look the same. It is understood that suitable leads for the separate phases are provided. The winding pattern will depend upon the number of poles desired. As is well known in the motor winding art, the winding progresses around the structure. This circular progression can be obtained in Figure 11 by having all complete wire loops lie in slots 180 electrical degrees apart, plus or minus the necessary pitch angle. The winding is based upon direct current motor or generator practice with the commutator omitted.

Secondary winding elements 156 are also provided, these being in the form of coils threading one aligned row of teeth. Thus, Figure 12 shows the end of secondary winding element 56, this having the end loops where the wire goes up from one side of a row of teeth around to the other side of the same row of teeth. Thus, one secondary winding element 156 is coupled to one aligned row of teeth. The various secondary elements 156 are connected in series with adjacent winding elements reversed in polarity to form a complete secondary winding.

It is clear that teeth 146 may be saturated due to the smaller amount of magnetizable material as compared to the central and exterior portions of the structure.

The entire structure will be maintained rigid by bolts 157 threaded through apertures in ears 142. It is understood that the construction may be handled like a transformer with regard to impregnating with insulation and the provision of cooling means and the like. To protect the windings at the end of the structure, a bell-shaped plate may be provided at each end. It is clear that by proper design of the primary windings, a rotating field will be produced when excited by polyphase alternating currents. With sufficient excitation all the teeth will be saturated except two rows of teeth 180 electrical degrees apart. The toothed members may be formed of readily saturable ferromagnetic metal such as Mumetal, while the remainder of the magnetizable parts may be of ordinary transformer steel.

In the actual assembly of the structure shown in Figure 12, the alternate discs and toothed members will be assembled to form a stack. Thereafter, the exciting and secondary windings will be applied to the projecting rows of teeth. Finally, the split annular members will be disposed between adjacent toothed members. Thus, it is possible to wind the structure like a motor.

Figures 13, 14:
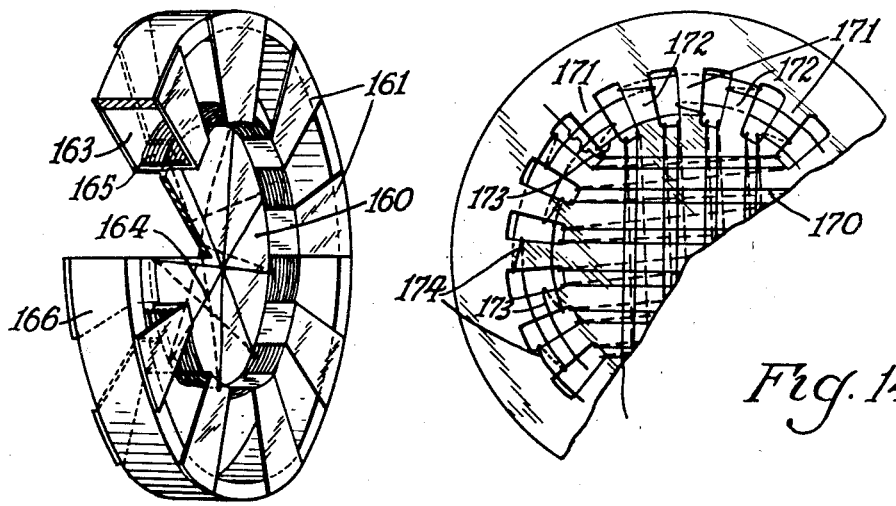
Figure 13 is a perspective view of a still further modification of a multiplier.
Figure 14 is a diagrammatic view illustrating a multiplier having a two-phase output but following along the general lines of the construction shown in Figure 11.

Referring now to Figure 13, a simple construction is shown wherein the magnetic circuit has a comparatively small quantity of ferromagnetic material. It is understood that several frequency multipliers utilizing the present invention may be cascaded so that the output of one will supply the input of the next multiplier in the series. As the input frequency goes up, the amount of ferromagnetic material necessary for proper operation for the same power level goes down. Thus, a relatively massive structure, such as shown in Figure 12 for example, may be excited by comparatively low frequencies, such as 60 cycles per second. This structure may provide a multiplying factor of nine, for example, and generate 540 cycles per second. The 540 cycles per second may be applied to a structure generally similar to Figure 12, but less massive, or may be applied to a multiplier having an altogether different physical structure. Thus, another multiplying step of nine to the 540 cycles would raise the frequency to 4860 cycles per second. At this frequency and higher frequencies, it is clear that substantially less ferromagnetic material is required. The structure shown in Figure 13 may be used at any desired frequencies but will be found to be more efficient with increasing frequency.

In Figure 13, generally circular disc part 160 has two times an odd number of teeth 161 extending therefrom. The disc and teeth may be integral and the readily saturable material as Mumetal. Teeth 161 are bent alternately to one side and the other of the plane of disc part 160 to provide annular channel 163 extending around the periphery of disc part 160. Suitable exciting windings may be provided. Thus as shown, drum type of winding 164 is provided. No rigorous showing of this winding is given as it is well known in the art. Thus, examples of windings which may be used are given in "Standard Handbook for Electrical Engineers," McGraw-Hill Book Company, seventh edition, pages 771–773. The commutators will be omitted. The same general winding technique is used in polyphase motors, particularly in connection with the stators where rotary fields are to be generated.

Secondary winding 165 may be a simple coil in channel 163. Annular ring 166 is disposed to connect the tooth tips. Ring 166 is of ferromagnetic material and may be of silicon steel or even of Mumetal. The mass of ring 166 may be great enough so that, even if it is of readily saturable material, it may operate satisfactorily.

It may be necessary to shape teeth 161 so that the parts of the teeth adjacent output winding 165 can readily saturate for proper operation. It is understood that laminations may be used.

As has been previously indicated, it is possible to have polyphase outputs. Thus, in those constructions where the secondary winding does not consist of a single coil but of a plurality of coils, each coil forming a secondary winding element, the following expedient may be relied upon. A group of adjacent winding elements may be considered as the individual elements for separate phases in the output. If three phase output is desired, three adjacent winding elements may be considered as the individual winding elements of the three separate phases. The winding element of one phase may then continue on to the successive winding element of the same phase. All winding elements for one phase will be two times an odd number for each 360 electrical degrees of path length. The excitation of the primary may be so adjusted as to provide for such polyphase operation.

Referring to Figure 14, a modification of the structure of Figure 11 is shown. In this structure, exciting windings 170 may be the same as in Figure 11. However, the structure provides two series of teeth 171 and 172. Teeth 171 alternate with teeth 172, and each series has two times an odd number of teeth. Teeth 171 have secondary winding elements 173, all connected together in series, with successive winding elements reversed in polarity. Similarly, teeth 171 have secondary winding elements 174 also connected in series with successive elements reversed in polarity.

The tooth construction and relative proportions of air gap between teeth 171 and 172 may be varied to secure desired operating conditions.

In the case of those structures where the secondary winding forms a simple coil, polyphase operation may be secured by disposing a plurality of multipliers adjacent each other but having the proper phase angular advance. The same exciting windings may be used so that the exciting field in each multiplier unit will be in phase.

Figure 15:
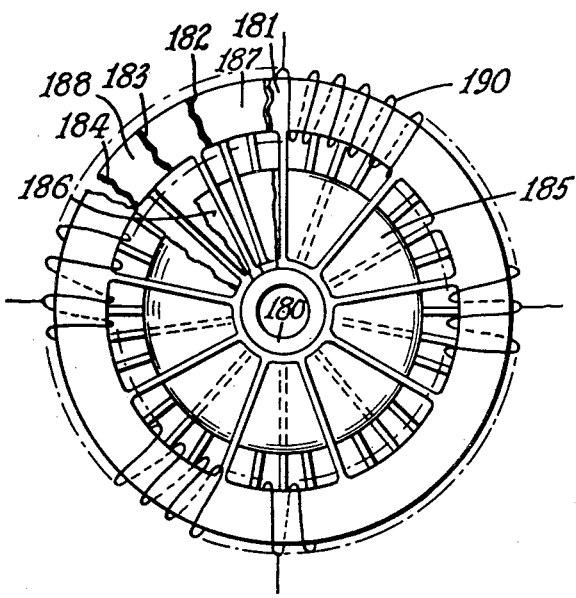
Figure 15 is a diagrammatic view illustrating a multiplier having a two phase output but following the general construction of the multiplier shown in Figures 7 to 9 inclusive.

Referring to Figure 15, a two phase construction based upon the structure shown in Figures 7 to 9 inclusive is disclosed. In this particular case, hub 180 may serve for both multiplier structures. Spoked members 181 to 184 inclusive may be disposed on the hub. Each of the spoked members has an odd number of spokes with the number of spokes in one member the same as in another member. The spokes in members 181 and 182 cooperate in a manner similar to that of Figures 7 to 9 inclusive. Thus, the spokes of member 182 are angularly staggered with respect to member 181 for multiplier action.

Spoked members 183 and 184 also cooperate in a manner similar to the structure shown in Figures 7 to 9 inclusive. Spoked members 183 and 184 as a unit, however, are angularly staggered with respect to spoked members 181 and 182. Thus, the spokes of members 183 and 184, if projected, would lie half way between projected spokes of members 181 and 182.

Secondary output windings 185 and 186 are provided for each pair of spoked members respectively. Outer rings 187 and 188 serve to complete the magnetic circuit between the rims of the cooperating spoked members. A single exciting winding 190, here shown as a simple Gramme ring type, is provided.

Figure 16:
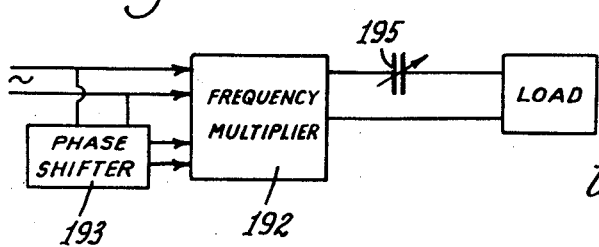
Figure 16 is a circuit diagram for the multiplier embodying this invention and its connection to a load.

Referring now to Figure 16, a simple block diagram of a system is shown wherein any one of the frequency multipliers previously described may be used. Thus, frequency multiplier 192 may be energized either from a two-phase or three-phase source. A single phase alternating current source may be used in conjunction with phase shifter 193 for supplying two-phase alternating current. Phase shifter 193 may be any one of a number of different types, all well known in the art. Multiplier 192 has the secondary output winding connected to any suitable load through condenser 195. This condenser may be variable or standardized to a certain predetermined size. In the event that more than one output phase is provided by the multiplier, then it is understood that each output circuit will be similarly connected. The inclusion of the condenser generally improves the operation of the system.

It will be understood that "ferromagnetic element" as used in the claims and specification may include a plurality of adjacent physically separate ferromagnetic elements operating as one unit to provide a secondary pole and having one winding element coupled thereto. Such distributed windings are well known in the motor and generator art.

It will be evident that the various structural forms which the invention may assume provide a frequency multiplier which is relatively simple and which has desirable operating characteristics. The operation of the entire structure depends upon saturating properties of ferromagnetic materials. The multiplied output has waves which are substantially symmetrical with respect to a center line. While the various forms of the invention have been shown as of the type having a closed circular path for the field, it will be evident that the invention may be modified so that a substantially linear path for the field may be provided. As a simple example, the form of the invention shown in Figures 4 and 5 may be cut open and the circular structure straightened out. Thus, the 360 electrical degrees would then be extended along a geometrically straight path. The other structures may be similarly handled.

It will be understood that the operation of the various structures embodying the invention, as described in connection with Figure 1, is more or less idealized. In actual practice, the simplest procedure for obtaining satisfactory operating conditions is to control the excitation. Thus, with proper excitation, the wave form of the multiplied frequency may be observed on an oscillograph. For maximum frequency multiplication in one device, it is clear that one effective pole pair should be used. Where several effective pole pairs are used, the frequency multiplication for the entire structure is reduced in a manner similar to the reduction in speed of a synchronous motor when the effective pole pairs are increased.

What is claimed is:

1. A static frequency multiplier having a ferromagnetic core consisting of two body portions connected by a path-defining portion, said path-defining portion containing spaced ferromagnetic teeth elements extending transversely thereof, exciting windings for generating a cyclically moving magnetic field within said core with the magnetic flux extending longitudinally of the teeth and the field as a whole moving transversely to the teeth and lengthwise of the path-defining portion, said path-defining portion having a length corresponding to an integral number of path units, each unit of which has a length corresponding to 360 electromagnetic degrees with reference to exciting current, a path unit containing the following for one output phase; a series of ferromagnetic teeth elements forming an odd number of pole pairs, the exciting field creating two conjugate saturated zones spaced from each other by two spaced conjugate unsaturated zones, the teeth in one saturated zone having a magnetic polarity opposite to that of the teeth in the other saturated zone, each unsaturated zone containing a magnetic neutral region with the two neutral regions spaced 180 electromagnetic degrees apart, each unsaturated zone including substantially no more than one entire pole at one time, winding elements linking all teeth, each winding element having a cooperating tooth and becoming active for generating action when its cooperating tooth is swept by an unsaturated zone, and means for connecting the winding elements corresponding to one pole pair in series with the winding elements corresponding to other pole pairs to output terminals to provide a potential at a multiplied frequency whose step-up ratio is said first-mentioned odd number.

2. A static frequency multiplier having a ferromagnetic core consisting of two body portions connected by a closed path-defining portion, said path-defining portion containing spaced ferromagnetic teeth elements extending transversely thereof, exciting windings for generating a rotating magnetic field within said core with the magnetic flux extending longitudinally of the teeth and the field as a whole in its rotation moving transversely to the teeth and lengthwise of the path-defining portion, said path-defining portion having a length corresponding to an integral number of path units, each unit of which has a length corresponding to 360 electromagnetic degrees with reference to exciting current, a path unit containing the following for one output phase; a series of ferromagnetic teeth elements forming an odd number of pole pairs, the exciting field creating two conjugate saturated zones spaced from each other by two spaced conjugate unsaturated zones, the teeth in one saturated zone having a magnetic polarity opposite to that of the teeth in the other saturated zone, each unsaturated zone containing a magnetic neutral region with the two neutral regions spaced 180 electromagnetic degrees apart, each unsaturated zone including substantially no more than one entire pole at one time, winding elements linking all teeth, each winding element having a cooperating tooth and becoming active for generating action when its cooperating tooth is swept by an unsaturated zone and means for connecting the winding elements corresponding to one pole pair in series with the winding elements corresponding to other pole pairs to output terminals to provide a potential at a multiplied frequency whose step-up ratio is said first-mentioned odd number.

3. The structure according to claim 2 wherein the ferromagnetic teeth form a generally wave shaped pattern and wherein the winding elements form a coil with adjacent ferromagnetic teeth forming poles alternately on opposite sides of said coil.

4. The structure according to claim 2 wherein the ferromagnetic teeth elements form a generally wave shaped pattern extending alternately on opposite sides of a flat plane and wherein the winding elements form a coil with successive ferromagnetic teeth elements extending alternately on opposite sides of said coil.

5. The structure according to claim 2 wherein the path-defining portion is generally flat and wherein each winding element encircles a tooth.

6. The structure according to claim 2 wherein a number of separate path units overlap, each path unit corresponding to one output phase with ferromagnetic teeth elements forming a pole for each phase in succession along the path for providing as many output phases as there are separate overlapping path units.

7. The structure according to claim 2 wherein separate multiplier structures are aligned and combined on a common axis with the path unit for one multiplier being staggered angularly with respect to path units of other multiplier units, said aligned multiplier units having a common exciting field with the path unit and winding elements for each phase providing individual outputs having predetermined phase angle corresponding to the angular stagger for the units.

8. The structure according to claim 2 wherein one body portion forms an inner part of the structure, said path-defining portion enclosing said one body portion with the teeth extending outwardly from said one body portion and wherein the other body portion has an annular shape joining the free ends of said teeth.

9. The structure according to claim 2 wherein one body portion forms an inner part of the structure, said path-defining portion enclosing said one body portion with the teeth extending outwardly from said one body portion, a series of teeth consisting of two equal groups, one group of teeth being angularly staggered with respect to the other group, said winding elements comprising a coil disposed around said one body and between said two groups of teeth and said other body portion having an annular shape extending around and joining the free ends of all said teeth.

10. A frequency multiplier comprising a central ferromagnetic core portion, an annular ferromagnetic core portion surrounding said central core portion, and a plurality of ferromagnetic teeth elements extending between said central and annular core portions, said teeth being symmetrically disposed with an odd number of pole pairs being providing for each output phase for each 360 electromagnetic degrees of excitation, polyphase windings on the central core portion for providing at any instant magnetic flux extending from the central core along some teeth through the annular core and along other teeth back to the central core and an output winding around the central core with teeth forming adjacent poles being on opposite sides of said winding, said winding and magnetic structure cooperating to saturate all but one pair of teeth 180 electrical degrees apart to form a part of poles, said exciting field rotating so that successive pairs of poles 180 electromagnetic degrees apart go through an unsaturating cycle to provide an output at a stepped-up frequency with the step-up ratio being said odd number.

11. A frequency multiplier comprising a central ferromagnetic core, an annular ferromagnetic core surrounding said central core, a set of teeth for one output phase extending between said central core and annular core, a set of teeth for a second output phase extending between the central and annular cores, the set of teeth for one output phase being laterally displaced from the set of teeth for the other output phase, the number of teeth in each output phase being the same and forming an odd number of pole pairs, all said teeth being symmetrically disposed with one set of teeth for one output phase being angularly staggered with respect to the set of teeth for the other output phase to provide an over-all symmetrical tooth arrangement, an output coil winding for one phase disposed around the central core with teeth of the set forming poles corresponding to one phase alternately on opposite sides of the coil, another output coil winding for the second phase disposed around the central core with teeth of the set forming poles corresponding to the second phase alternately on opposite sides of said coil, and polyphase windings for exciting said structure, said windings at any instant generating a field whose flux extends from the central core along some teeth of each set to the annular core thence along said annular core and along other teeth of each set and thence back to the central core, said exciting field and magnetic structure cooperating to saturate all but one pair of teeth 180 electrical degrees apart to form a pair of poles, said exciting field rotating so that successive pairs of poles in each set for each 360 electromagnetic degrees of exciting current go through an unsaturating cycle, a pair of poles in each set being 180 electromagnetic degrees apart to provide two-phase alternating potential at a frequency step-up equal to said odd number.

12. A static frequency multiplier having a central ferromagnetic core, an annular ferromagnetic core surrounding said central core, a set of ferromagnetic teeth elements symmetrically disposed and extending between said central core and annular core, the teeth forming an odd number of pole pairs for one output phase for each 360 electromagnetic degrees of excitation, a coil for each tooth functioning as an output winding element, means for connecting said coils to output terminals with coils for adjacent poles reversed in polarity, and polyphase windings disposed on said central core, said polyphase windings providing an exciting field whose flux at any instant extends from the central core along some teeth to the annular core, along said annular core and along other teeth back to the central core, said exciting windings and core cooperating to saturate all but one pair of teeth, for each phase, 180 electrical degrees apart to form a pair of poles, said exciting field rotating so that only coils corresponding to successive pairs of poles 180 electromagnetic degrees apart have substantial potentials induced therein to provide an alternating potential at a frequency step-up corresponding to said odd number.

13. The structure of claim 12 wherein a plurality of sets of teeth are provided with one set of teeth for each output phase, the sets of teeth overlapping to form adjacent poles corresponding to different phases, the coils for one set of teeth being connected to form a winding for one output phase and the remaining coils being connected correspondingly to form windings for the remaining output phases.

WILLIAM H. BUSSEY.

REFERENCES CITED

The following references are of record in the file of this patent:

FOREIGN PATENTS

| Number | Country | Date |
| --- | --- | --- |
| 305,944 | Germany | June 3, 1918 |